(12) United States Patent
Ive et al.

(10) Patent No.: US 12,498,895 B2
(45) Date of Patent: Dec. 16, 2025

(54) HEAD-MOUNTED DEVICE WITH PUBLICLY VIEWABLE DISPLAY

(71) Applicant: Apple Inc., Cupertino, CA (US)

(72) Inventors: Jonathan P. Ive, San Francisco, CA (US); Julian Hoenig, Lisbon (PT); Julian Jaede, San Jose, CA (US); Seung Wook Kim, San Jose, CA (US); Christopher Wilson, San Francisco, CA (US); William A. Sorrentino, III, Kentfield, CA (US); Alan C. Dye, San Francisco, CA (US); Stephen O Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/433,601

(22) Filed: Feb. 6, 2024

(65) Prior Publication Data

US 2024/0296002 A1    Sep. 5, 2024

Related U.S. Application Data

(63) Continuation of application No. 16/010,275, filed on Jun. 15, 2018, now abandoned.

(Continued)

(51) Int. Cl.
*G06F 3/147* (2006.01)
*G06F 3/01* (2006.01)
(Continued)

(52) U.S. Cl.
CPC ............ *G06F 3/1423* (2013.01); *G06F 3/013* (2013.01); *G06F 3/147* (2013.01); *G06T 11/60* (2013.01);
(Continued)

(58) Field of Classification Search
CPC .... G06T 11/60; H04N 5/232; H04N 5/44504; G02B 27/017; G02B 2027/0187;
(Continued)

(56) References Cited

U.S. PATENT DOCUMENTS

| | | |
|---|---|---|
| 8,704,879 B1 | 4/2014 | Cheng et al. |
| 8,957,835 B2 | 2/2015 | Hoellwarth |

(Continued)

FOREIGN PATENT DOCUMENTS

| | | | |
|---|---|---|---|
| EP | 2981070 A1 | 2/2016 | |
| EP | 3454184 A1 * | 3/2019 | ........... G02B 27/017 |
| JP | 2016526237 A * | 9/2016 | |

OTHER PUBLICATIONS

Mai et al., Transparent HMD: Revealing the HMD User's Face to Bystanders, MUM 2017, Nov. 26-29, 2017, 6 pages, Stuttgart, Germany.

(Continued)

*Primary Examiner* — Chante E Harrison
(74) *Attorney, Agent, or Firm* — Treyz Law Group, P.C.; Kendall P. Woodruff

(57) ABSTRACT

A head-mounted device may be worn on the face of a user. The head-mounted device may include a user-viewable display that presents inwardly directed user-viewable images such as virtual reality images to the user. The head-mounted device may also have a publicly viewable display that presents publicly viewable images to individuals near the user. The publicly viewable images may overlap facial features of the user's face. Publicly viewable images may include captured images of user facial features or other content, may include computer-generated graphics such as user facial feature graphics, may contain a mixture of captured image content and overlaid graphics such as user facial feature graphics, or may contain other publicly viewable content. User monitoring sensors such as camera and (Continued)

gaze detection sensors, environmental sensors, and other circuitry in the head-mounted device may gather information that is used in adjusting the publicly viewable images.

19 Claims, 10 Drawing Sheets

Related U.S. Application Data

(60) Provisional application No. 62/520,816, filed on Jun. 16, 2017.

(51) Int. Cl.
*G06F 3/14* (2006.01)
*G06T 11/60* (2006.01)
*H04N 5/445* (2011.01)
*H04N 23/60* (2023.01)

(52) U.S. Cl.
CPC ......... H04N 5/44504 (2013.01); H04N 23/60 (2023.01)

(58) Field of Classification Search
CPC ..... G06K 9/00302; G06F 3/013; G06F 3/147; G06F 3/143
See application file for complete search history.

(56) References Cited

U.S. PATENT DOCUMENTS

| | | | |
|---|---|---|---|
| 9,046,999 B1 | 6/2015 | Teller et al. | |
| 9,213,185 B1 | 12/2015 | Starner et al. | |
| 9,341,849 B2 | 5/2016 | Wong et al. | |
| 9,429,759 B2 | 8/2016 | Hoellwarth | |
| 9,482,869 B2 | 11/2016 | Hoellwarth | |
| 9,595,237 B2 | 3/2017 | Hoellwarth | |
| 9,646,573 B2 | 5/2017 | Hoellwarth | |
| 9,740,282 B1 | 8/2017 | McInerny | |
| 9,749,451 B2 | 8/2017 | Hoellwarth | |
| 9,874,755 B2 | 1/2018 | Tempel et al. | |
| 9,927,614 B2 | 3/2018 | Vallius | |
| 9,959,678 B2 | 5/2018 | Katz et al. | |
| 10,156,896 B2 | 12/2018 | Lee et al. | |
| 10,168,778 B2 | 1/2019 | Kazansky et al. | |
| 10,306,036 B2 | 5/2019 | Hoellwarth | |
| 10,306,037 B2 | 5/2019 | Hoellwarth et al. | |
| 10,306,038 B2 | 5/2019 | Hoellwarth et al. | |
| 12,197,805 B2 * | 1/2025 | Ive | G06F 3/011 |
| 2006/0170669 A1 | 8/2006 | Walker et al. | |
| 2010/0079356 A1 | 4/2010 | Hoellwarth | |
| 2010/0079426 A1 | 4/2010 | Pance et al. | |
| 2010/0162149 A1 | 6/2010 | Sheleheda et al. | |
| 2011/0169911 A1 | 7/2011 | Gabura | |
| 2011/0169928 A1 | 7/2011 | Gassel et al. | |
| 2011/0185057 A1 | 7/2011 | Waugaman et al. | |
| 2011/0194029 A1 | 8/2011 | Herrmann et al. | |
| 2011/0304629 A1 | 12/2011 | Winchester | |
| 2012/0050140 A1 | 3/2012 | Border et al. | |
| 2012/0050141 A1 | 3/2012 | Border et al. | |
| 2012/0050143 A1 | 3/2012 | Border et al. | |
| 2012/0182206 A1 | 7/2012 | Cok et al. | |
| 2012/0223956 A1 | 9/2012 | Saito et al. | |
| 2013/0044128 A1 | 2/2013 | Liu et al. | |
| 2013/0117377 A1 | 5/2013 | Miller | |
| 2013/0154906 A1 | 6/2013 | Braun et al. | |
| 2014/0160250 A1 | 6/2014 | Pomerantz et al. | |
| 2014/0232816 A1 | 8/2014 | Wilson et al. | |
| 2014/0361977 A1 | 12/2014 | Stafford et al. | |
| 2014/0368537 A1 | 12/2014 | Salter et al. | |
| 2015/0067580 A1 | 3/2015 | Um et al. | |
| 2015/0138065 A1 | 5/2015 | Alfieri | |
| 2015/0177906 A1 | 6/2015 | Yairi et al. | |
| 2015/0253573 A1 | 9/2015 | Sako et al. | |
| 2015/0378161 A1 | 12/2015 | Bailey et al. | |
| 2015/0379896 A1 | 12/2015 | Yang et al. | |
| 2016/0018655 A1 | 1/2016 | Imoto et al. | |
| 2016/0054565 A1 | 2/2016 | Izumihara et al. | |
| 2016/0110868 A1 | 4/2016 | Cheng et al. | |
| 2016/0116979 A1 | 4/2016 | Border | |
| 2016/0161746 A1 | 6/2016 | Ahearn | |
| 2016/0210783 A1 | 7/2016 | Tomlin et al. | |
| 2016/0313790 A1 | 10/2016 | Clement et al. | |
| 2016/0328875 A1 | 11/2016 | Fang et al. | |
| 2016/0350973 A1 | 12/2016 | Shapira et al. | |
| 2016/0357318 A1 | 12/2016 | Chan et al. | |
| 2017/0068500 A1 | 3/2017 | Rochford et al. | |
| 2017/0090851 A1 | 3/2017 | Takano et al. | |
| 2017/0206691 A1 | 7/2017 | Harrises et al. | |
| 2017/0230640 A1 | 8/2017 | Rochford et al. | |
| 2017/0315608 A1 | 11/2017 | Shanware | |
| 2017/0326457 A1 | 11/2017 | Tilton et al. | |
| 2017/0339372 A1 | 11/2017 | Valli | |
| 2018/0004478 A1 | 1/2018 | Chen | |
| 2018/0005429 A1 | 1/2018 | Osman et al. | |
| 2018/0018943 A1 * | 1/2018 | Clarke | G09G 5/14 |
| 2018/0024799 A1 | 1/2018 | Jarvenpaa et al. | |
| 2018/0031844 A1 | 2/2018 | Decreton et al. | |
| 2018/0059318 A1 * | 3/2018 | Nichol | G02B 6/0043 |
| 2018/0074351 A1 * | 3/2018 | Smoot | A42B 3/042 |
| 2018/0075659 A1 | 3/2018 | Browy et al. | |
| 2018/0082482 A1 | 3/2018 | Motta et al. | |
| 2018/0088323 A1 | 3/2018 | Bao et al. | |
| 2018/0095636 A1 | 4/2018 | Valdivia et al. | |
| 2018/0096533 A1 | 4/2018 | Osman | |
| 2018/0101227 A1 | 4/2018 | Frueh et al. | |
| 2018/0101994 A1 | 4/2018 | Da Veiga et al. | |
| 2018/0136471 A1 | 5/2018 | Miller et al. | |
| 2018/0157333 A1 | 6/2018 | Ross et al. | |
| 2018/0164587 A1 | 6/2018 | Nakamura | |
| 2018/0182141 A1 | 6/2018 | Caballero et al. | |
| 2018/0247676 A1 | 8/2018 | Raphael et al. | |
| 2018/0288354 A1 | 10/2018 | Anderson et al. | |
| 2018/0314323 A1 | 11/2018 | Mikhailov et al. | |
| 2018/0324177 A1 | 11/2018 | Wang | |
| 2018/0335929 A1 | 11/2018 | Scapel et al. | |
| 2019/0116252 A1 | 4/2019 | Hoellwarth | |
| 2019/0235246 A1 | 8/2019 | Hu et al. | |
| 2019/0235621 A1 | 8/2019 | Hu et al. | |
| 2019/0371028 A1 | 12/2019 | Harrises et al. | |
| 2020/0225734 A1 | 7/2020 | Magnusson et al. | |

OTHER PUBLICATIONS

Misawa et al., Wearing Another's Personality: A Human-Surrogate System with a Telepresence Face, ISWC '15, Sep. 7-11, 2015, 8 pages, Osaka, Japan.

Osawa et al., Emotional Cyborg: Human Extension with Agency for Emotional Labor, HRI '14, Mar. 3-6, 2014, 1 page, Bielefed, Germany.

Qiu et al., E-Gazes Glasses: Simulating Natural Gazes for Blind People, TEI '16, Feb. 14-17, 2016, 8 pages, Eindhoven, Netherlands.

Ens et al., Candid Interaction: Revealing Hidden Mobile and Wearable Computing Activities, UIST '15, Nov. 8-11, 2015, 10 pages, Charlotte, NC, USA.

Falk et al., The BubbleBadge: A Wearable Public Display, PLAY: Applied Research on Art and Technology, May 29, 2014, 3 pages, Gothenburg, Sweden.

Chan, Liwei et al., "FrontFace: facilitating communication between HMD users and outsiders using front-facing-screen HMDs", MobileHCI '17: Proceedings of the 19th International Conference on Human-Computer Interaction with Mobile Devices and Services, pp. 1-5, Sep. 2017 (Year: 2017).

Gugenheimer et al., FaceDisplay: Enabling Multi-User Interaction for Mobile Virtual Reality, CHI '17, May 6-11, 2017, 4 pages, Denver, CO, USA.

Pohl et al., See what I see: concepts to improve the social acceptance of HMDs, IEEE VR 2016, 2 pages.

Frueh et al., Headset Removal for Virtual and Mixed Reality, SIGGRAPH '17 Talks, 2 pages, Los Angeles, CA, USA.

(56) References Cited

OTHER PUBLICATIONS

Gugenheimer et al., FaceDisplay: Towards Asymmetric Multi-User Interaction for Nomadic Virtual Reality, CHI 2018, Apr. 21-26, 2018, 13 pages, Montreal, QC, Canada.
Hamilton, "Google Can Recreate Your Face For Better Mixed Reality Footage," https://uploadvrccom/google-is-recreating-faces-now/, Feb. 21, 2017, 6 pages.
Author Unknown, "Artefact Light VR Concept Diagram", 1 page, at least as early as Jan. 2018.
Author Unknown, "Artefact Shadow VR Concept Diagram", 1 page, at least as early as Jan. 2018.
Author Unknown, "Light," 1 page, at least as early as Jan. 2018.
Ruxin Chen, U.S. Appl. No. 62/357,348, Specification (Year: 2016).
Ruxin Chen, U.S. Appl. No. 62/357,348, Drawings (Year: 2016).
Author Unknown, "VR 2020: A More Inclusive Vision for Virtual Reality", Artefact, Mar. 2016, Artefact Group, Seattle, WA, United States, https://www.artefactgroup.com/case-studies/vr20-20/.
Jiannan Li et al., "Interactive Two-Sided Transparent Displays: Designing for Collaboration", Communication & Collaboration, Jun. 21-25, 2014, pp. 395-404.
David Lindlbauer, "Combing Shape-Changing Interfaces and Spatial Augmented Reality Enables Extended Object Appearance", Real Reality Interfaces, May 7, 2016, pp. 791-802.
YouTube, "Augmented Reality for Children's Coloring Books", https://www.youtube.com/watch?v=0E8E1vsTa-E, Jun. 13, 2017.
YouTube, "Drum Pants at Augmented World Expo 2013", httQs //youtube/Y6d HObO!3vv, Jun. 8, 2013, 2 pages.
YouTube, "Transparent Dual-Touch Display Android Smartphone Prototype #DigInfo", https://www.voutube.com/watch?v=Xbyooo!5ZvvY, May 30, 2012, 3 pages.

\* cited by examiner

HEAD-MOUNTED DEVICE WITH PUBLICLY VIEWABLE DISPLAY

This application is a continuation of patent application Ser. No. 16/010,275, filed Jun. 15, 2018, which claims priority to provisional patent application No. 62/520,816, filed Jun. 16, 2017, both of which are hereby incorporated by reference herein in their entireties.

FIELD

This relates generally to electronic devices and, more particularly, to head-mounted display devices.

BACKGROUND

Head-mounted devices such as virtual reality glasses and mixed reality glasses may be used to provide a user with virtual content. Virtual reality glasses can be used to display virtual worlds to a user without the intrusion of real-world content. Mixed reality glasses may be used to overlay virtual content on top of real-world content.

Although the content that is provided to a user of a head-mounted device may be engaging for the user, head-mounted devices tend to isolate users from their surroundings. As a result, a user may become immersed in a virtual environment to the exclusion of the outside world. Interactions between the user and people in the user's environment may be extremely limited or non-existent. For example, there is often no way for a person standing next to a user wearing a head-mounted device to discern the user's emotions or to recognize the identity of the user.

SUMMARY

A head-mounted device may be worn on the face of a user. The head-mounted device may include a user-viewable display that presents inwardly directed user-viewable images such as virtual reality images or other virtual content to the user. The head-mounted device may also have a publicly viewable display that presents people surrounding the user with publicly viewable images. The publicly viewable display may overlap the facial features of the user's face. Images presented with the user-viewable display may be directed inwardly toward the user, while images presented with the publicly viewable display may be presented outwardly away from the user so that these publicly viewable images are not visible to the user. Individuals in the vicinity of the user may view the publicly viewable images on the publicly viewable display while images such as virtual reality images and/or mixed reality images are being displayed privately to the user with the user-viewable display Publicly viewable images may include captured images of user facial features or other image content gathered with a camera, may include computer-generated graphics such as user facial feature graphics, may contain a mixture of captured image content and overlaid graphics such as user facial feature graphics, or may contain other publicly viewable content. User monitoring sensors such as camera and gaze detection sensors, environmental sensors, and other circuitry in the head-mounted device may gather information that is used in adjusting the publicly viewable images.

Publicly viewable content may be displayed that reflects environmental conditions, the state of the user of the head-mounted device, identities and other attributes of people in the vicinity of the head-mounted device, and other attributes of a user of the head-mounted device and those in the vicinity of the user. This publicly viewable content may serve as a graphical interface that helps people interact with the head-mounted display. The presentation of content on the head-mounted display that is publicly viewable may therefore help promote interactions between the user and others. For example, by publicly displaying information on the identity of the user and information on whether a user is available to interact with others, people in the vicinity of the user will know when it is appropriate to communicate with the user.

DETAILED DESCRIPTION

Figure 1:
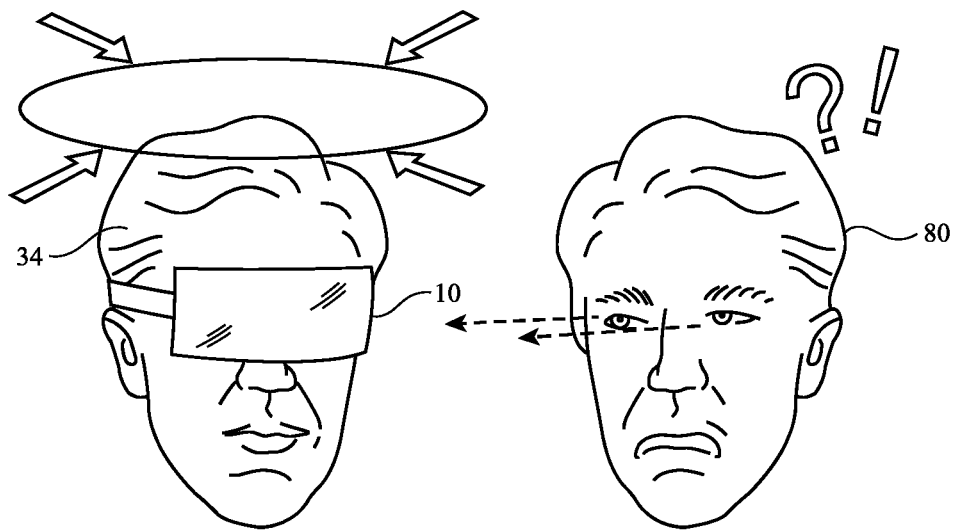
FIG. 1 is a diagram illustrating an operating mode for a head-mounted device that is not displaying publicly viewable content in accordance with an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The disclosure relates to facilitating interactions with users of head-mounted display devices. Users of head-mounted displays such as virtual reality goggles are generally cut off from their surroundings. In virtual reality scenarios, the user's view of their surroundings may be partially or fully blocked. Head-mounted displays such as goggles can be large enough to cover a large portion of a user's face, making it difficult or impossible to recognize a user. Not only is the user's identity obscured, but information on the user's current status such as the user's emotional state and the nature of the user's current activities in using the head-mounted display is not available to nearby people. There is generally no way for someone observing a user of a head-mounted display to determine the identity of the user with certainty or to determine whether the user is engrossed in a game or is available for social interactions. Conventional head-mounted displays present no public output that helps others know whether a user is engaging with them or not. Conventional head-mounted displays therefore create an unnatural environment for the user and people in the vicinity of the user and can cause people in the vicinity of the user to become agitated because they do not know whether they can interact with the user.

To address these concerns, a head-mounted display may be provided with output devices such as publicly viewable displays and other components that provide publicly available output to people in the vicinity of a user of the head-mounted display. The output may convey information to people nearby to the user such as information on the identity of the user, information on the user's state such as whether the user is engaged in viewing content or is available to interact, and information on content that the user is currently viewing using the head-mounted display. When people in the vicinity of the user are able to recognize the identity of the user and view information on the current state of the user, these people will not be agitated by the presence of the head-mounted display on the user's head.

Publicly viewable information and other output provided to people in the vicinity of the user may be displayed using status indicator lights, may be presented using visual output components that are not status indicators lights such as displays, may be presented using speakers (e.g., using pre-recorded audio clips), may be presented by transmitting this information to a head-mounted display, handheld device, or other equipment of people in the vicinity of the user (e.g., using wireless transmission from the user's device), and/or may be presented using other arrangements.

These and other embodiments are discussed below with reference to FIGS. 1-16. However, those skilled in the art will readily appreciate that the detailed description given herein with respect to these figures is for explanatory purposes only and should not be construed as limiting.

When head-mounted displays are worn on the head of a user, some or all of the user's facial features are blocked from view. As shown in FIG. 1, when user 34 is wearing a wearable system such as head-mounted device 10, the user's eyes and/or other facial features (e.g., eyebrows, etc.) are blocked from view by people nearby such as nearby person 80. This creates an awkward social situation that can be frustrating for people in the vicinity of user 34. For example, a nearby person such as person 80 may be confused or upset in this situation, because the absence of visual cues from user 34 makes it difficult to determine the user's current state. Person 80 cannot determine whether user 34 is immersed in a video game and does not want to be interrupted or whether user 34 is engaged in the user's surroundings and is ready to socially interact with person 80. The lack of visual cues on the state of user 34 therefore tends to cut off user 34 from others nearby and hinders the user's ability to interact with others.

Figure 2:
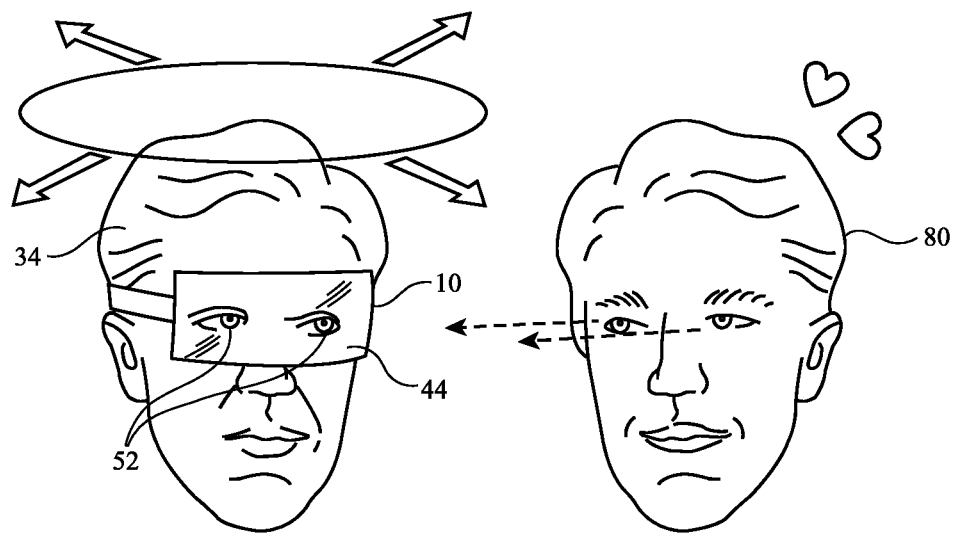
FIG. 2 is a diagram illustrating an operating mode for a head-mounted device that is displaying publicly viewable content in accordance with an embodiment.

To address this concern, device 10 can be provided with one or more publicly viewable visual output devices such as publicly viewable display 44 of FIG. 2. Display 44 may be used to display information that helps user 34 convey information on the user's state of mind and other user status information to people in the vicinity of user 34. For example, display 44 may display images of the user's eyes 52 or other facial features. The images of the user's eyes 52 or other facial features may be generated based on sensor data (e.g., captured images of the user's real-world eyes), gaze tracking information indicating the orientation of the user's eyes, and/or other information that accurately reflects the user's current state. Based on the captured images of the user's eyes or other information, the appearance of eyes 52 may be adjusted. In this way, users such as user 34 may convey information on their activities and state to people around user 34 such as nearby person 80. This reduces confusion and frustration on the part of people such as nearby person 80. Although sometimes described in connection with displaying facial features such as captured images of a user's eyes, publicly shared information from device 10 may, in general, include any suitable output. For example, audio clips such as prerecorded messages from the user may be played to people in the vicinity of the user, visual information may be displayed using status indicators and other non-display devices, logos and other icons can be displayed instead of facial features or in addition to facial features (e.g., logos associated with a creator of virtual reality content or other content being presented to a user), text can be presented, video, graphics, and/or other still and/or moving image content can be presented. If desired, information on content that is currently being viewed by the user using a display in device 10 (e.g., information images displayed on an inwardly directed display in device 10) may be displayed on publicly viewable display 44. For example, if a user is playing a video game, the visual content for the game may be presented on display 44 in addition to being presented to the user. The content that is presented may include messages targeted to nearby individuals, messages with user-defined content, icons, text messages, or other content that is tailored to a current operating mode of device 10. The current operating mode of device 10 may, for example, be an operating mode such as a virtual reality mode in which virtual reality content is presented to a user, an augmented reality mode in which both real-world environmental content and overlaid computer-generated virtual content are presented, or a real-world environment mode in which real-time camera images of the user's environment are presented for the user without any overlaid virtual content. The use of a publicly viewable display to present captured facial features of a user is merely illustrative. Moreover, ancillary devices may, if desired, be used to display information such as the information displayed on publicly viewable display 44. These ancillary devices may include publicly viewable displays that are separate from device 10 and may include displays on handheld devices and head-mounted devices that are operated by people other than the user. Light-emitting devices in ancillary objects (e.g., illuminated objects with control circuitry for controlling the light-emitting devices such as clothing, watch bands, and other wearable items, tables and other furniture, and other objects in the vicinity of the user) may also be used in conveying information on the operating mode of device 10 and the state of the user. Wired and/or wireless communications between device 10 and the ancillary devices may be used to provide the ancillary devices with information on the state of the user and device 10. If desired, the ancillary devices may present information on the user and device 10 using audio signals (e.g., by playing the soundtrack of a video being watched by the user).

Head-mounted display devices such as device 10 may be used for virtual reality and mixed reality systems (sometime referred to as augmented reality systems). A head-mounted device such as a pair of augmented reality glasses that is worn on the head of a user may be used to provide a user with computer-generated content that is overlaid on top of real-world content. The real-world content may be viewed directly by a user (e.g., by observing real-world objects through an optical coupler in a display system that merges light from real-world objects with light from a display). Configurations in which images of real-world objects are captured by a forward-facing camera and displayed for a user on a display may also be used. If desired, the head-mounted device may be a pair of virtual reality glasses. Virtual reality glasses typically block out real world content while presenting virtual content for the user. Virtual content presented in a mixed reality or virtual reality head-mounted device may include private content that is not visible to individuals other than the user of the head-mounted device. Private content may, if desired, be selectively revealed to public viewers by the user of device 10. For example, the user of device 10 may, if desired, direct device 10 to display a duplicate copy of the content being viewed privately by the user on a publicly viewable display. This helps inform people around the viewer of the current activities of the viewer (e.g., whether the viewer is currently viewing virtual content).

Figure 3:
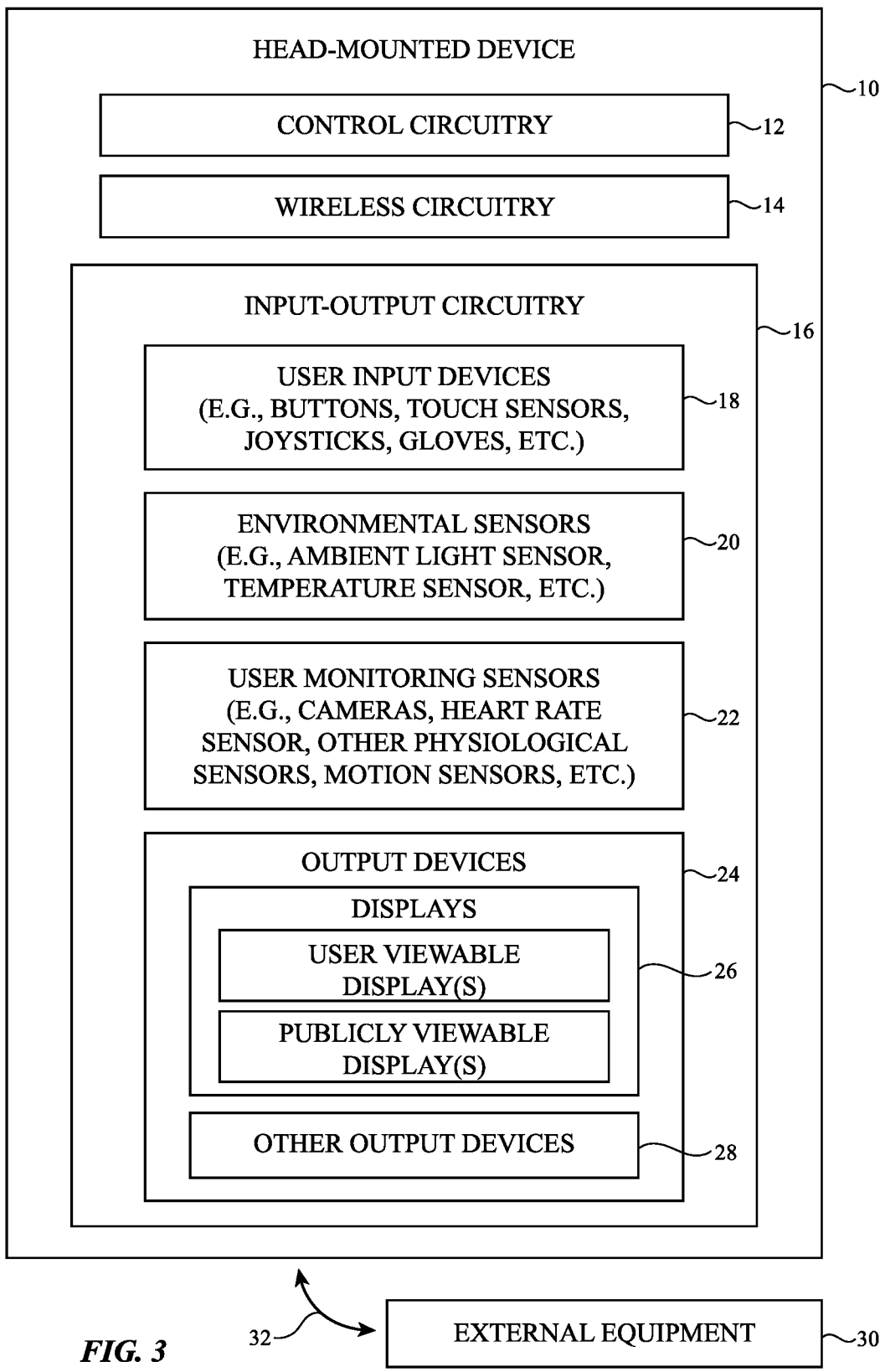
FIG. 3 is a schematic diagram of an illustrative system such as a virtual reality system having a head-mounted electronic device in accordance with an embodiment.

A schematic diagram of an illustrative head-mounted device is shown in FIG. 3. As shown in FIG. 3, head-mounted device 10 may have control circuitry 12. Control circuitry 12 may include storage and processing circuitry for controlling the operation of electronic device 10. Circuitry 12 may include storage such as nonvolatile memory (e.g., electrically-programmable-read-only memory configured to form a solid state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations such as operations involved in gathering information with sensors, operations involving the adjustment of components using control signals, operations involving the presentation of images on displays in device 10, etc.).

Head-mounted device 10 may include communications circuitry for operating with external devices such as eternal equipment 30 over wired and/or wireless communications links such as communications link 32. Head-mounted device 10 may, for example, include wireless circuitry 14. Wireless circuitry 14 may include wireless communications circuitry. The wireless communications circuitry may include one or more antennas and radio-frequency transceiver circuitry for transmitting and receiving wireless signals over wireless links such as illustrative wireless link 32 with external equipment 30. If desired, external equipment 30 may be coupled to device 10 using wired connections in addition to or instead of using wireless communications. External equipment 30 may be a peer device (e.g., another device having the components of device 10 of FIG. 3), may be accessories, may be host computers or other host equipment, may include online data sources (e.g., servers for supplying weather information and/or other information), may be an electronic device associated with a person in the vicinity of the user of device 10, and/or may be other circuitry external to device 10.

Wireless communications circuitry in device 10 (e.g., circuitry in wireless circuitry 14) may be used in communicating with wireless local area network equipment (e.g., WiFi® equipment in equipment 30). Wireless communications circuitry in device 10 may also communicate using cellular telephone frequencies, using near-field communications, and/or using other wireless communications bands and protocols. If desired, wireless communications circuitry or other wireless circuitry 14 in device 10 may be used to detect and/or identify electronic devices (e.g., equipment 30) associated with people in the vicinity of device 10. For example, equipment 30 may be a portable electronic device associated with an acquaintance of the user of device 10. Equipment 30 may broadcast local wireless signals that identify equipment 30 as belonging to the acquaintance of the user (e.g., short-range signals having a range of 0-10 m, at least 1 m, at least 2 m, less than 20 m, etc.). In this type of arrangement, device 10 can use wireless circuitry 14 to detect the broadcast wireless signals and thereby detect when the acquaintance of the user is in the vicinity of device 10 and the user. In response to detection that the acquaintance is present, appropriate information can be displayed by device 10 on a publicly viewable display in device 10 and/or this information can be transmitted wirelessly to equipment 30 for presentation to the acquaintance using equipment 30. Other techniques for identifying nearby individuals and providing these individuals with information may also be used by device 10, if desired.

Device 10 may also include input-output circuitry 16. Input-output circuitry 16 includes user input devices 18. User input devices 18 may include electrical components that allow a user of device 10 to supply control circuitry 12 with user input. For example, user input devices 18 may include buttons, joysticks, track pads, force-sensitive buttons, keyboards, gesture recognition sensors (e.g., sensors based on image sensors and/or other sensors that detect user gestures such as hand wave gestures, etc.), microphones for gathering voice commands, and/or other circuitry for gathering commands and other input from a user. If desired, devices 18 may include virtual reality gloves that track a user's hand motions and finger motions and that use these motions in controlling device 10.

Device 10 may also include environmental sensors 20. Environmental sensors 20 may include devices such as ambient light sensors, temperature sensors, humidity sensors, moisture sensors, air particulate sensors, carbon dioxide sensors and other gas concentration sensors, barometric pressure sensors and other air pressure sensors, magnetic sensors, cameras (e.g., one or more cameras that capture real-time images of the real-world environment currently surrounding device 10 so that these images may be presented in real time on a user viewable display and/or for recording images), gaze detection components (e.g., to detect a gaze of an external person in the vicinity of device 10), and/or other sensors that can gather readings on the environment surrounding the user of device 10.

User monitoring sensors 22 may be used to monitor the user of device 10. For example, sensors 22 may include image sensors (cameras) for gathering images of a user's face (e.g., user facial feature images such as images of eyes, eyebrows, eyelids, etc.) and other portions of a user. In some configurations, user monitoring sensors 22 may include cameras (digital image sensors) and other components that form part of a gaze tracking system. The camera(s) or other components of the gaze tracking system may face a user's eyes and may track the user's gaze (e.g., images and other information captured by the gaze tracking system may be analyzed by the circuitry of device 10 such as control circuitry 12 to determine the direction in which the user's eyes are oriented). This gaze information may be used to determine the location on a user-facing display in device 10 where the user's eyes are directed (sometimes referred to as the point of gaze of the user). If desired, the gaze tracking system may also gather information on the focus of the user's eyes and other information such as eye movement information and information on eyelid position (e.g., the duration and timing of eye blinking). The gaze tracking system of user monitoring sensors 22 may sometimes be referred to as a gaze detection system, eye tracking system, gaze tracking system, or eye monitoring system. If desired, image sensors other than cameras (e.g., infrared and/or visible light-emitting diodes and light detectors, etc.) may be used in monitoring a user's gaze in the system of FIG. 3.

User monitoring sensors 22 may also include heart rate sensors (e.g., optical heart rate sensors that emit light and process detected reflected light signals, pressure-based heart rate sensors, etc.), blood oxygen level sensors, perspiration sensors (e.g., sensors based on image sensors and/or moisture sensors that detect user skin moisture levels), blood pressure sensors, electrocardiogram sensors, accelerometers to measure body movements, other physiological sensors, and/or other sensors that can measure attributes associated with a user. If desired, user monitoring sensors 22 may include motion sensors that measure the motion of device 10 and user 34. The motion sensors may be inertial measurement units based on components such as accelerometers, gyroscopes, and/or compasses, and/or may include other circuitry that measures motion (e.g., a visual odometry system). A motion sensor in sensors 22 may, for example, determine whether a user is sitting or is otherwise at rest or is walking, running, riding a bicycle, or is otherwise in motion and/or engaged in a physical activity.

Output devices 24 may include devices such as displays 26 and other visual output devices. In some configurations, status indicators may be used to present visual information. A status indicator or other non-display visual output device may include a light-emitting diode or other light-emitting component to convey information (e.g., a component that produces illumination using a fixed color, using multiple colors, using a time-varying light pattern, etc.). For example, a status indicator formed from a pair of light-emitting diodes of different colors may emit light of a first color when the user is busy and viewing content and may emit light of a second color when the user is not busy and is available for social interactions. A pair of these status indicators may also be used to represent the user's left and right eyes and may change color depending on whether the user's eyes are open or closed. In other configurations, non-status-indicator visual output devices may be used in presenting visual information such as images. Non-status-indicator visual output devices may include devices for presenting adjustable text, devices for presenting still and/or moving graphics, and displays (e.g., displays with pixel arrays having at least 1000 pixels, at least 10,000 pixels, fewer than million pixels, or other suitable number of pixels for presenting images).

In general, displays and other light-emitting components that emit light (e.g., light-emitting diodes, lasers, lamps, status indicator lights formed from multiple light sources such as these, backlit low-resolution output components such as backlight electrophoretic components, backlit patterned ink symbols, etc.) may be used to present any suitable visual information (e.g., icons, icons that flash with predetermined patterns or that have predetermined colors to convey information about the state of the user, whether content is being presented to the user, and/or other status information). Non-display components may have relatively few adjustable light-emitting components (e.g., 2-10 light-emitting diodes, fewer than 15 light-emitting diodes, at least one light-emitting diode, etc.). Displays 26, which generally include thousands of pixels or more, may be liquid crystal displays, liquid crystal-on-silicon displays, microelectromechanical systems displays, electrophoretic displays, light-emitting diode displays (e.g., organic light-emitting diode displays, displays based on pixels formed from crystalline semiconductor dies, etc.), or displays based on other display technologies. Displays 26 may include touch sensitive displays (e.g., displays with two-dimensional touch sensors formed from two-dimensional capacitive touch sensor electrode arrays) or may be insensitive to touch.

Displays 26 may include one or more inwardly facing displays that are visible to a user of head-mounted device 10. Inwardly facing displays, which may sometimes be referred to as user viewable displays, privately viewable displays, or internal display assemblies, may have display surfaces (pixel arrays) that are oriented towards a user's eyes and may be hidden from view by individuals other than the user.

Displays 26 may also include one or more outwardly facing displays. Outwardly facing displays, which may sometimes be referred to as publicly viewable displays or external display assemblies may have display surfaces that are oriented away from the user. Outwardly facing displays will be visible to people in the vicinity of a user of device 10 but will not generally be visible to the user of device 10. An inwardly facing display may have the same resolution as an outwardly facing display or, if desired, the inwardly facing display may have a higher resolution than the outwardly facing display to enhance display quality for the user.

Outwardly facing displays can provide information that enables outward interactions of the user with the real world (e.g., people in the vicinity of the user). Outwardly facing displays may, for example, display information about the content that a user is viewing, information on the identity of the user, information on whether a user is occupied or is available for social interactions, whether the user is currently able to view the user's surroundings (e.g., whether a front-facing camera is active and real-world images captured with the front-facing camera are being displayed on the user's privately viewable display so that the user may be ready for social interaction with nearby people) and other information on the state of the user. As an example, the outwardly facing display may display an image (or graphical representation) of the user's open eyes when the user is able to view the real world and is available for social interaction. An outwardly facing display may be used in forming a graphical user interface for people in the vicinity of the user (e.g., selectable on-screen items when the outwardly facing display is a touch screen or displays information responsive to voice commands from people in the vicinity of the user, etc.).

If desired, the publicly viewable display or other visual output device may display a logo of a content creator associated with a currently playing movie on a user viewable display, text or other information on whether a user is busy or is available for social interaction, preselected text, information tailored to particular people, and information on the user's facial features or graphical representations of the user's facial features and the environment (e.g., eyes, cartoon eyes in which computer-generated graphical elements are used into represent the user's eyes, computer-generated graphics representing sweat on a user's brow if it is currently hot, etc.). Visual output devices that have lower resolution than the publicly viewable display may include a device for displaying a backlit icon or text, may include a low-resolution visual output device containing pre-patterned text, may include segmented indicators (e.g., text output equipment formed from sixteen segment indicators), may include logo-shaped light-emitting diodes or sets of light-emitting diodes, and/or may include other lower resolution visual output circuitry.

In some configurations, the outwardly displayed information may be based at least partly on information on people in the vicinity of device 10. For example, an outwardly facing camera in device 12 may capture an image of a person that is known to the user (e.g., the user's friend Bob). Control circuitry 12 may use image recognition techniques to recognize that Bob is present or may sense the presence of Bob's electronic device to recognize that Bob is present and may, in response, present a message on a publicly viewable display that is tailored to Bob (e.g., "Hi Bob, sorry I can't talk right now, I'm busy"). Such messages may include still and/or moving images (user-defined text, auto-generated text, prerecorded video, still and/or moving graphics, etc.).

When a user is busy watching virtual reality content, a display or other the non-status-indicator visual output device may display a do not disturb message (e.g., text such as "I'm sorry, but I'm busy now and do not wish to be disturbed") or a do not disturb message in the form of a "do not disturb" icon or moving image. Closed eyes (images or graphic depictions of closed eyes) may be used to indicate that a user is not available for social interaction or images of the user's open eyes may be annotated with a do not disturb message to make it clear that the user is busy. When a user is not busy (e.g., when a camera is presenting a user with inwardly directed images of the world around the user so that the user can view the environment in which device 10 is operating), information may be displayed indicating that the user is viewing the world (e.g., an icon or a text message indicating that the user is "seeing outside", an image of the user's open eyes or graphical representation of open eyes, and/or other seeing outside message). When a user is using an external camera to record the user's surroundings, information may be displayed indicating that the camera is active such as the text "recording" or other active recording mode message. In some scenarios, a user may be willing to be interrupted, so device 10 may use a publicly viewable display to display a message such as "Hi! If you'd like to talk to me, just say 'hey'". If a person in the vicinity of the user says "hey" or supplies other appropriate voice commands, device 10 can respond accordingly (e.g., by displaying information on the user viewable display such as a text notification, a notification in the form of an avatar, or other virtual content that indicates to the user that a person or a specific individual in the vicinity of the user is interested in speaking with the user).

Output devices 24 may, if desired, include other output devices 28. Output devices 28 may include speakers or other devices that produce sound, may include haptic output devices (e.g., electromechanical devices that create vibrations, piezoelectric devices, and/or other haptic output devices), and/or may include devices that produce other output for the user and/or for people nearby the user. Speakers can be used to present audio content that is audible to the public that conveys information about the user's state and other relevant information. As an example, a user may pre-record audio clips and these audio clips may be played when a specific person or other individual is detected in the vicinity of device 10. As an example, a user may prerecord a message "Sorry, I'm busy now" and this message may be played using a speaker in devices 24 in response to detection of people in the vicinity of device 10, in response to detection of spoken voices in the vicinity of device 10, in response to detection of movement or noise in the vicinity of device 10, in response to detection of people known to the user in the vicinity of device 10, etc. As with publicly viewable content that is displayed on a publicly viewable display in device 10, audio clips can convey information on the nature of content being currently played on a user viewable display in device 10, information on whether a user is busy or is available for social interaction, information on the current operating mode for device 10 (virtual reality, augmented reality, real-world viewing, etc.), information tailored to particular people, etc. In some arrangements, an artificial intelligence persona implemented using control circuitry 12 and associated online resources may be used in presenting audible content and responding to voice commands from people in the vicinity of device 10.

Head-mounted device 10 may have straps or other attachment mechanisms that allow head-mounted device 10 to be worn on the head of a user as a pair of goggles, may be a helmet or hat, may be a pair of glasses, or may be other suitable head-mountable equipment.

Figure 4:
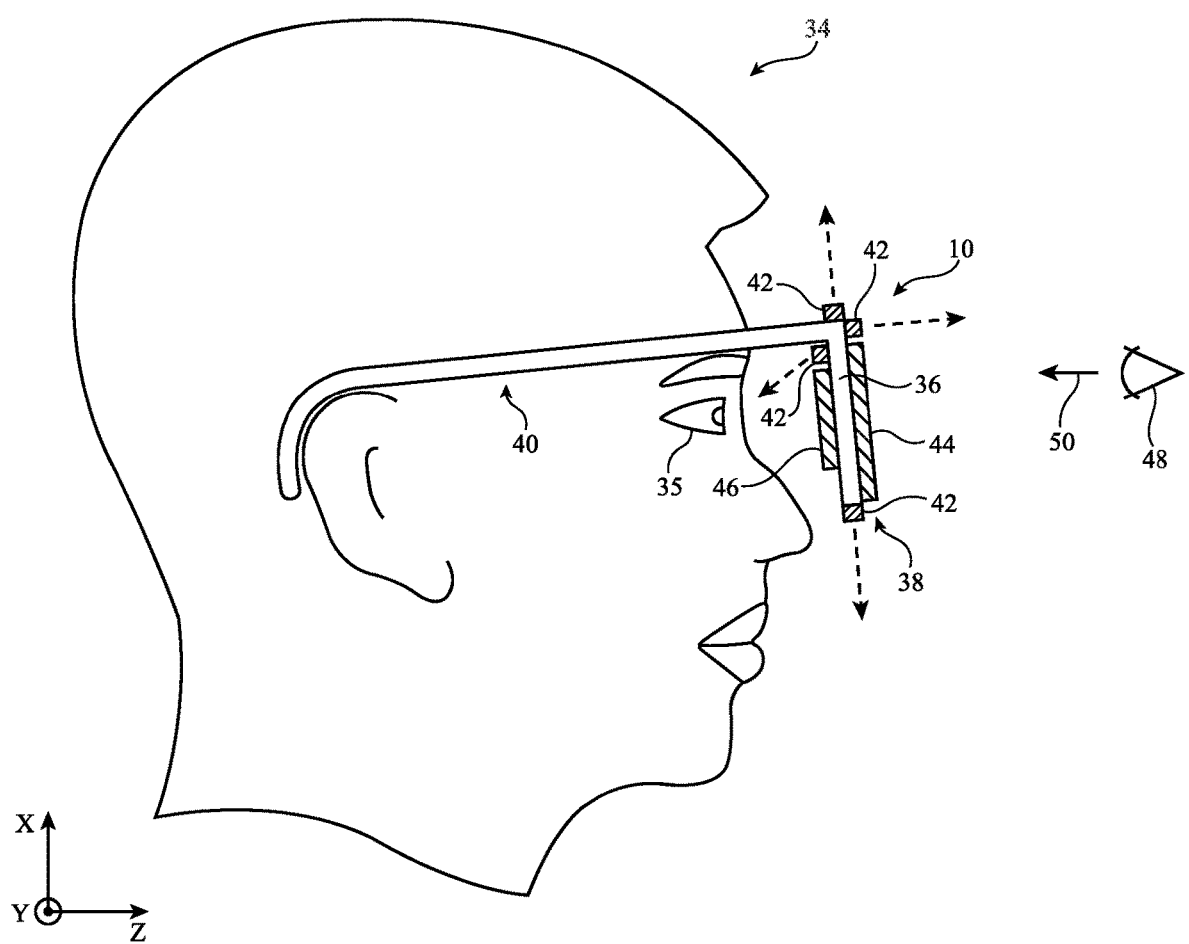
FIG. 4 is a cross-sectional side view of an illustrative head-mounted device on a head of a user in accordance with an embodiment.

FIG. 4 is a cross-sectional side view of head-mounted device 10 (e.g., a pair of goggles or glasses) having a front portion 38 including a support structure such as display support structure 36 and left and right side support structures such as right side support structure 40. Front portion 38 may include a bridge, nose pads, rims, helmet structures, goggle support structures and/or other structures for supporting components in device 10 such as illustrative front support structure 36 coupled to side support structures 40 (e.g., a strap, temples in glasses, etc.).

As described in connection with FIG. 3, device 10 may include a user-viewable display that presents images to user 34 (e.g., content for a virtual reality experience such as virtual reality game content with which a user may interact, movies, text, graphics, and/or other still and/or moving images). The display may be formed from a pixel array that produces the images. Associated optical components (lenses, waveguides, optical couplers, and/or other optical components) may be used to route the images from the pixel array to the user (e.g., in the −Z direction of FIG. 4). The display and associated optical components may be incorporated into head-mounted device 10 in a configuration that allows a user such as user 34 who is looking outwardly along the +Z direction of FIG. 4 to view the images that are being produced by the display. The display may be mounted on support structures 40 (e.g., in an arrangement in which waveguides and couplers are used to direct light towards user's eyes 35) and/or may be mounted in a location that faces the user. For example, a user-viewable display may be mounted on the inner surface of support structure 36 facing user 34, as shown by illustrative user-viewable display 46. The user-viewable display in device 10 (e.g., display 46) may include a single pixel array that spans both eyes 35 of user 34 or may have left and right pixel arrays that are respectively used to display left and right image content to the left and right eyes of user 34. In configurations in which device 10 is coupled by link 32 to external equipment 30 (e.g., to receive content for a user viewable display, etc.), external equipment 30 may contain a display that can be viewed by people in the vicinity of the user. In this type of arrangement, the display in external equipment 30 can be used to present publicly viewable content (e.g., publicly viewable images of the type that may be displayed on the publicly viewable display of device 10) and/or may be used to play audio of the type that may be presented using a speaker in devices 28 of device 10.

In addition to user-viewable displays such as display 46, device 10 may include publicly viewable displays such as publicly viewable display 44. Display 44 may be mounted in an outwardly facing orientation on support structure 36 (as an example). In this orientation, people in the vicinity of user 34 such as external viewer 48 may view images on display 44 when viewing user 34 and display 44 in direction 50. Displays such as display 44 and/or lower resolution visual output devices such as segmented indicators backlit icons and/or other light-emitting components may be mounted on any suitable portion of device 10. In the example of FIG. 4, display 44 covers part of the user's face (e.g., the user's eyes 35 and portions of the user's nose and lower forehead). Display 44 in the example of FIG. 4 also blocks most or all of the support structures and other components of device 10 from view, so that display 44 is the primary component being viewed from the front of user 34. Configurations for publicly viewable displays in which less of the user's face is covered by display 44 or in which more of the user's face is covered by display 44 may also be used.

Displays such as displays 46 and 44 (e.g., displays 26 of FIG. 3) may be formed using any suitable types of displays. If desired, displays 46 and 44 may be formed from different types of displays. For example, display 46 may be formed from a liquid-crystal-on-silicon display or microelectromechanical systems display and display 44 may be formed from an organic light-emitting diode display or electrophoretic display and/or other suitable displays, etc.

As shown in FIG. 4, device 10 may include electrical components 42. Components 42 may include user input devices 18, environmental sensors 20, user monitoring sensors 22, output devices 24 and/or other input-output circuitry 16 (FIG. 3). Components 42 may supply output and/or gather input along any suitable directions. For example, components 42 may contain image sensors or other sensors that are mounted to device 10 in orientations that allow these sensors to gather light traveling along the +/−Z dimensions, the +/−X dimensions, and/or the +/−Y dimensions, as shown by illustrative components 42 of FIG. 4. User monitoring sensors 22 (e.g., components 42 such as cameras and/or gaze detection devices) may face the user (e.g., to monitor the point-of-gaze of user eyes 35, to capture images of user facial features such as images of eyes 35 and portions of the user's face surrounding eyes 35, etc.

Outwardly directed sensors in components 42 (e.g., outwardly facing cameras, proximity sensors, ambient light sensors, and/or other environmental sensors 20, user input-devices 18, etc.) may gather images of the user's surroundings (e.g., by capturing images and gathering other input in directions facing above and/or below the user, to the left of the user, to the right of the user, and/or in front of the user).

Physiological sensors (e.g., heart rate sensors, etc.) and other sensors that may be used to gather information on user 34 may face inwardly and/or outwardly. In some configurations, sensors such as these may be placed on support structures 40 or other structures so that the sensors contact user 34 and/or may be located on an associated user device (e.g., a wristwatch, etc.) that is in wireless communication with device 10 (see, e.g., eternal equipment 30) using wireless communications link 32 and wireless circuitry 14. In general, input-output circuitry 16 and other components in device 10 may be mounted on support structures 40, support structure 36, and/or other support structures in device 10 (sometimes referred to as housing structures, body structures, a device housing, a device body, a frame, a helmet, glasses, etc.) and may be mounted facing away from user 34 and/or facing towards user 34.

In some arrangements, the inclusion of optical components, displays (e.g., user-viewable display 46), support structures (e.g., support structure 36), and/or other components in device 10 (see, e.g., the components of device 10 of FIG. 3) has the potential for blocking some or all of the user's face from view by people in the vicinity of user 34. This may partially or completely restrict the ability of the user to convey facial expressions and other information outwardly to these people. For example, it may be difficult or impossible for external viewers such as viewer 48 of FIG. 4 to determine from the user's outward appearance whether the user is crying, is happy, is angry, is winking, is sleeping and has their eyes closed, is calm or agitated, etc. As a result, there is a risk that user 34 will be isolated from people surrounding user 34.

To convey information about the user's emotions and other information about the user's appearance and thereby help connect user 34 to people surrounding user 34, output devices 24 such as publicly viewable display 44 and/or other output components may be used in conveying information about the user's state to people in the vicinity of the user. The information that is conveyed using publicly viewable display 44 and/or other output components may include information on the user's appearance such as information on the appearance of eyes 35 and/or other facial features, information on the user's physiological state (e.g., whether the user is perspiring, is under stress, etc.), information on the user's emotions (e.g. whether the user is calm, upset, happy, sad, etc.), and/or other information on the state of user 34. The information may be conveyed visually (e.g., using display 44 and/or light-emitting components such as light-emitting diode status indicator lights, dedicated visual output devices such as devices that illuminate icons, text, one or more different eye-shaped symbols, etc. without using a full pixel array, etc.) and/or may be conveyed in other forms (e.g., using sound such as tones, synthesized voice, sound clips, etc.). Illustrative configurations for device 10 in which information on the state of user 34 is displayed visually using a publicly viewable display such as display 44 may sometimes be described herein as an example.

Because display 44 is publicly viewable, visual information displayed on display 44 can be used to convey information about the state of user 34 to people who can view display 44 (e.g., people in the vicinity of user 34). These people might normally be able to interact with user 34 by virtue of observing the user's eyes and other facial features that are now being obscured by the presence of device 10. By placing appropriate information on display 44, control circuitry 12 can convey information about user 34 to others. The information may include text, graphics, and/or other images and may include still and/or moving content. The information that is displayed may be captured image data (e.g., captured images such as photographs and/or videos of facial features associated with user 34) and/or may be computer-generated images (e.g., text, graphics such as user facial feature graphics, computer-processed photographs and/or videos, etc.). In some situations, information gathered by control circuitry 12 using input-output circuitry 16 and/or wireless circuitry 14 may be used in determining the content to be displayed on display 44.

The information displayed on display 44 may be real (e.g., a genuine facial expression) or may be artificial (e.g., a synthetic facial expression that does not represent a user's true facial expression). Configurations in which the images that are displayed on display 44 are representative of a user's true state help the user communicate with surrounding people. For example, if a user is happy, displaying a happy facial expression on display 44 will help the user convey the user's happy state to surrounding people. Configurations in which images that are displayed on display 44 are not representative of the user's true state may also be used to convey information to other people. For example, a happy facial expression may be displayed on display 44 even if a user is not genuinely happy. If desired, a copy of the outwardly displayed facial expression or other publicly displayed information may be displayed on the user's private display (e.g., in a corner region of the display, etc.) so that the user is informed of the current outward appearance of device 10.

The use of display 44 may help a user convey information about the user's identity to other people. Consider, as an example, a scenario in which display 44 displays a photographic image of the user's facial features. The displayed facial features of the user may correspond to facial features captured in real time using an inwardly facing camera and/or may correspond to previously captured facial feature images (still and/or moving). By filling in portions of the user's facial features that are otherwise obscured due to the presence of device 10, display 44 may help people in the vicinity of user 34 recognize the identity of user 34.

Facial features may be displayed using a 1:1 replication arrangement. For example, control circuitry 12 may use display 44 to display an image of the portion of the user's face that is covered by display 44 without magnification or demagnification. Perspective correction may be applied to displayed images so that an image that is displayed on display 44 slightly in front of the surface of the user's face (e.g., 1-10 cm in front) will appear as if it is located directly at the surface of the user's face. In other situations, processed and/or synthesized content may be displayed on display 44. For example, display 44 may be used to display user facial feature graphics (graphical representations of the facial features of a user of device 10) such as computer-generated eyes (e.g., graphics containing eyes that resemble the user's real eyes and/or that appear significantly different than the user's real eyes). The eyes may have a blink rate that tracks the user's measured actual blink rate. The user's blinks may be detected using an inwardly facing camera or other user monitoring sensor 22. If desired, the computer-generated (control-circuitry-generated) eyes may have a computer-generated point-of-gaze that matches the user's measured point-of-gaze. The point-of-gaze of eyes 35 of the user may be measured using a gaze detection system in sensors 22. Other eye attributes may also be replicated such as pupil size or eye color. If desired, the eyes displayed on display 44 may have attributes that do not match the attributes of the user's eyes. For example, blink events, point-of-gaze, pupil size, eye color, and/or other eye attributes may be different for the computer-generated version of the eyes on display 44 than for eyes 35.

Information from environmental sensors 20 and/or from the internet or other sources (e.g., information obtained from external equipment 30 such as a weather server or other online data source) may be used in gathering information that is used in adjusting the images presented on display 44 (e.g., the attributes of camera-captured images and/or graphics such as user facial feature graphics). As an example, if sensors 22 or an online weather source indicate that user 34 is in a windy environment, the blink rate of computer-generated eyes on display 44 may be accelerated relative to the actual blink rate of the user's eyes. If control circuitry 12 determines from sensors such as a moisture sensor or an online weather source that the user is in a rainy environment, computer-generated raindrops may be placed on the user's facial features on display 44, even though the user's actual face may be free of raindrops.

In some situations, user 34 may be playing a game or interacting with other software running on device 10. As the user interacts with the software, the user may achieve goals (e.g., striking a target in a game). To reflect that the user has accomplished a desired goal or has failed at a particular task, display 44 may be used to display associated images (e.g., a satisfied user image in response to detecting that the user's goal has been achieved, a dissatisfied user image in response to detecting that the user's goal has not been achieved, etc.). In this way, the user's in-game experience can be communicated to people around the user.

In addition to publicly revealing information about the user's state and/or other information to everyone in the vicinity of user 34 who can view display 44, control circuitry 12 can use display 44 to present information selectively to particular people in the vicinity of device 10. As an example, control circuitry 12 may receive information on the identities of people near to user 34. This information may be received over link 32 from external equipment 30 (e.g., via the internet or other network, from the electronic devices of people near user 34, etc.). The identity information may, as an example, identify one or more people in the vicinity of user 34 as being known to user 34 (e.g., as social media friends, as business acquaintances, as family members, and/or as other people known to user 34), as being a particular person (e.g., "Bob"), as being a person who is ready to interact with user 34, or as being any other suitable person or type of person.

Information on the location of people in the vicinity of user 34 (e.g., information indicating that people are within viewing distance of display 44) may be gathered by processing location information gathered with device 10 and/or external equipment 30 (e.g., cellular telephones or other electronic devices of nearby people). As an example, each person's electronic device may contain a satellite-navigation-system receiver or other location determination circuitry that determines their location and device 10 may have a satellite navigation system receiver or other location determination circuitry that determines the location of device 10 for comparison. As another example, wireless circuitry 14 may be used to gather information on nearby electronic devices (e.g., location information gathered using wireless circuitry 14 such as wireless signal strength information, information that the equipment of the known people is within communications range of device 10, etc.).

When an appropriate individual's cellular telephone or other external equipment 30 is within a predetermined range of device 10, control circuitry 12 in device 10 can respond by displaying corresponding information on display 44 (and/or a display in equipment 30). The information may be tailored to the identity of the person who has come within viewing range of display 44, the type of person who has come within range (e.g., a person who has indicated by changing a setting in their equipment that they are ready to interact with others), and/or to other detected attributes of an in-range electronic device. As an example, display 44 may display an image of the user's facial features when a user's acquaintance Bob comes within range of device 10, may display information such as user facial feature graphics or other information indicating the user's current state (e.g., the user's emotional state, etc.) when a person of any type comes within range of device 10, may display a generic message when a person of a type that desires to interact with user 34 is detected in range of device 10, and/or may display other information when other people are detected within a predetermined distance of display 44 and device 10. In addition to modifying output on display 44 based on who is in the vicinity of device 10 and user 34, control circuitry 12 may modify displayed content based on heart rate data, other physiological data gathered using sensors 22, information gathered using environmental sensors 20, user input gathered with user input-devices 18, wirelessly received information from wireless circuitry 14, information gathered from external equipment 30, and/or other information.

In some situations, publicly viewable display 44 may display some or all of the same information that is being displayed on user viewable display 46. As an example, display 44 may mirror that content being displayed on display 46 to allow people in the vicinity of user 34 to monitor the images being displayed for the user. This allows the people in the vicinity of user 34 to share the user's experiences. If, as an example, a user is playing a game, people in the vicinity of the user can follow the user's in-game activities. In configurations in which display 44 is touch sensitive, people in the vicinity of display 44 can supply input to the game using the touch sensor of the display.

Figure 5:
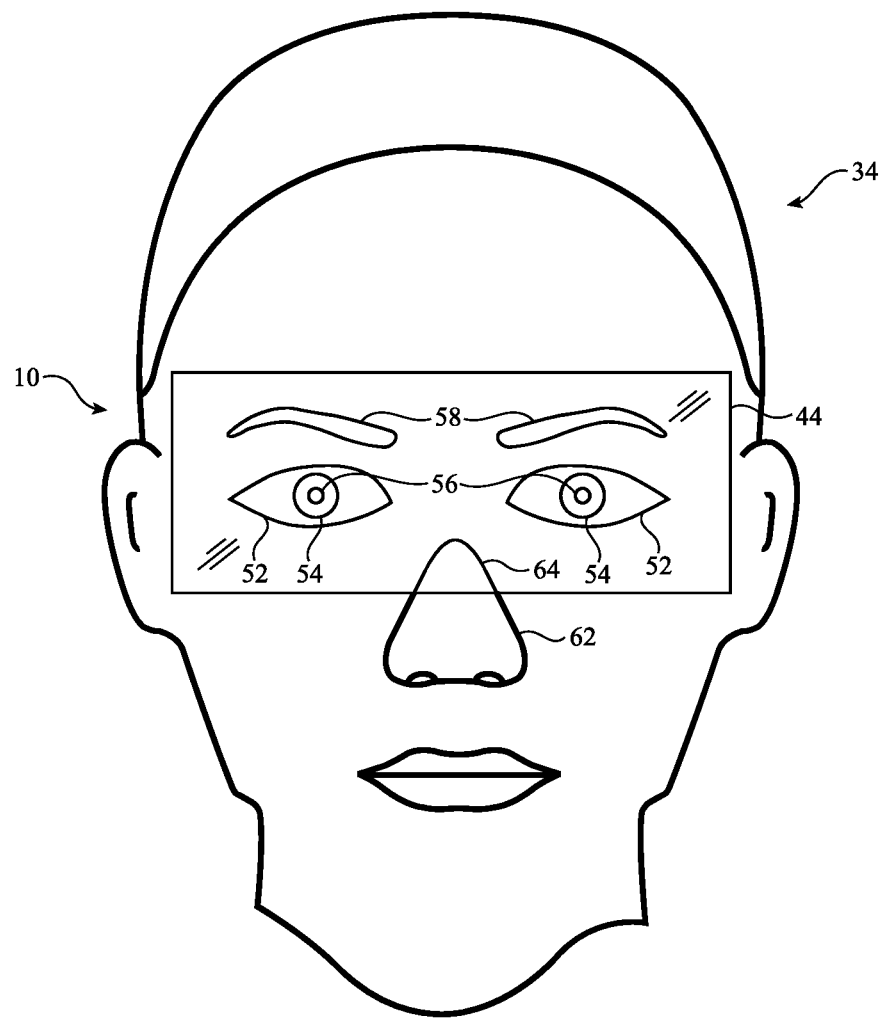
FIGS. 5, 6, and 7 are front views of an illustrative head-mounted device being used to display output in accordance with an embodiment.

Facial expressions and other information on the user's state may be displayed using captured images from a camera, processed captured images, computer-generated images (e.g., images containing graphical representations of facial features or other graphics), or using other image content. Consider, as an example, the scenario of FIG. 5. In the example of FIG. 5, display 44 is being used to display facial features such as eyebrows 58 and eyes 52. Eyes 52 may contain elements such as irises 54 and pupils 56. Facial features such as top portion 64 of nose 62 and/or skin textures (wrinkles, etc.) in the portions of skin surrounding eyes 52 and eyebrows 58 may also be presented on display 44.

If desire, the facial features that are displayed on display 44 may be positioned on display 44 in a location that makes it appear as if eyes 52 are recessed behind the normal front surface of display 44. For example, if a viewer is viewing display 44 from a 2:00 position (relative to the user), the eyes 52 may be shifted to the left on display 44 (when display 44 is viewed from the front). As a result of shifting eyes 52 in this way, eyes 52 will appear to lie on the surface of the user's face rather than being offset at an unnatural distance from the user's face due to the nonzero thickness of display 44 and the structures of device 10. Perspective corrections such as these may be made based on information of the relative location of a viewer of display 44 that is gathered using an externally facing camera, based on wireless location information, and/or based on other information about the viewing position of external viewers relative to display 44 and the face of the user. In scenarios in which display 44 is being viewed head on, the sizes of eyes 52 may be slightly decreased on display 44 so that eyes 52 appear to be located flush with the user's face.

The facial features presented on display 44 of FIG. 5 may be part of a captured image (e.g., a digital photograph or video clip) of the user's face or may be computer-generated graphical elements. Computer-generated user facial features graphics may be photorealistic and/or may contain simplified (cartoon) graphical elements. Attributes of the computer-generated facial features such as whether eyebrows 58 are raised or are in a normal resting position, whether the user's brow is furrowed, whether pupils 56 are dilated or constricted, whether irises 56 are pointed to the left or right, whether eyes 52 are widely opened or narrowly opened, and/or other attributes of the user's facial features may be incorporated into the displayed facial features. In computer-generated scenarios, these attributes may represent the user's actual facial features (e.g., pupil size in a computer-generated pupil may match the measured pupil size of the user's pupils, point-of-gaze values may match, eyebrow positions may match, etc.) or these attributes may differ from the user's actual facial features (e.g. the user's eyebrows may be in a normal resting position while computer-generated eyebrows on display 44 such as eyebrows 58 may be in a raised position.

Figure 6:
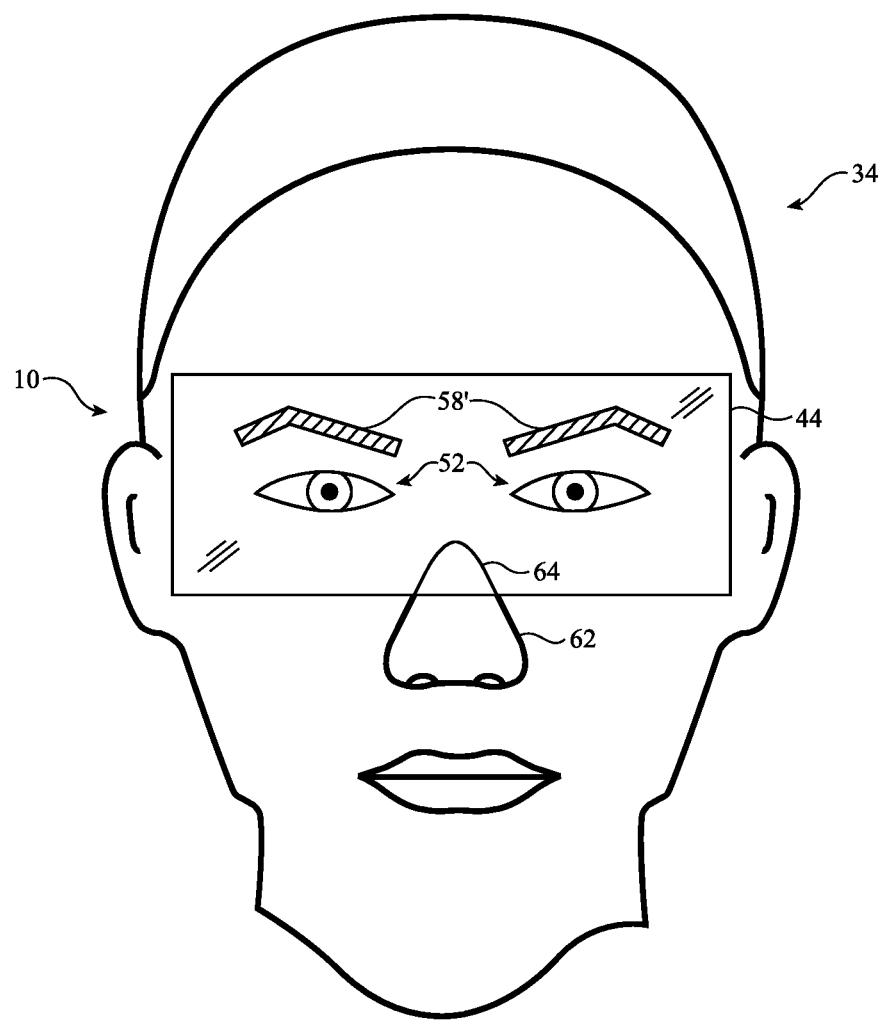

As shown in the example of FIG. 6, user facial feature graphics (computer-generated graphical elements) such as computer-generated eyebrows 58' may be overlaid on top of a captured image of the user's face (e.g., an image of facial features such as eyes 52, nose portion 64, etc.). In this type of blended environment, some of the image on display 44 may represent the user's actual face as it currently appears (or a prerecorded image of the user's face) and some of the image on display 44 may be computer-generated content that may or may not represent the user's current or past facial features. Computer-generated content that does not represent the user's current facial features, may be used for humorous effect, may be used to convey information other than the user's current appearance (e.g., information on the user's current game play status, the appearance of a user's in-game persona, other software state information, etc.), or may be used to convey other information to viewers.

Figure 7:
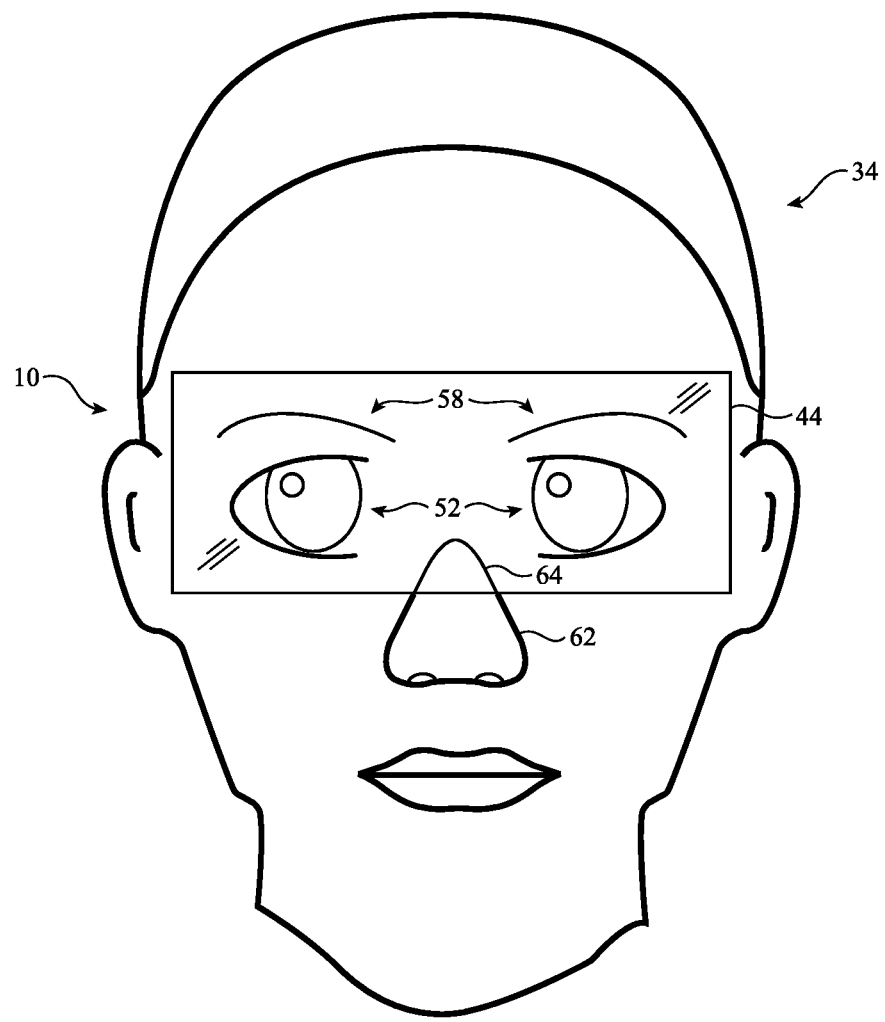

FIG. 7 is an example in which eyebrows 58 are computer generated and in which eyes 52 and nose portion 64 are computer generated. A cartoon graphical representation may be used for these facial features (e.g., for humorous effect, to simplify processing, etc.).

The examples of FIGS. 5, 6, and 7 are merely illustrative. In general, any suitable mixture of actual facial images and/or computer-generated content may be displayed on display 44 and this information may or may not be related to the user's state (e.g., the user's current facial features), may or may not be related to information gathered with input-output circuitry 16 (e.g., user input from devices 18, environmental information from sensors 20, and/or user information monitored using sensors 22), and may or may not be related to information received from external equipment 30. Examples of information that may be displayed on display 44 by control circuitry 12 include a 1:1 representation of the user's facial features gathered using a user-facing camera, a cartoon image of facial features, a processed version of an image captured with a user-facing camera (e.g., an imaged altered by adjusting color cast attributes such as skin tone, color saturation attributes, and intensity attributes, an image processed to provide edge enhancement, posterization effects, pixilated effects, sketch effects, painterly effects, blur effects, etc.), a computer-generated avatar, an image containing an alternate persona (e.g., a realistic captured photograph or computer-generated representation of a famous person), a simplified representation of the user's facial feature including only prominent features such as eyes and eyebrows, etc., an emoji, an animal or other being (e.g., an animal with facial features such as eyes with attributes such as a point-of-gaze attribute tracking corresponding attributes in the user's facial features), and overlays of computer-generated content on captured images (e.g., graphical facial features on real-life facial features). This information may be selected and/or adjusted based on information gathered by input-output circuitry 16, information received from external equipment 30, or other information.

Figure 8:
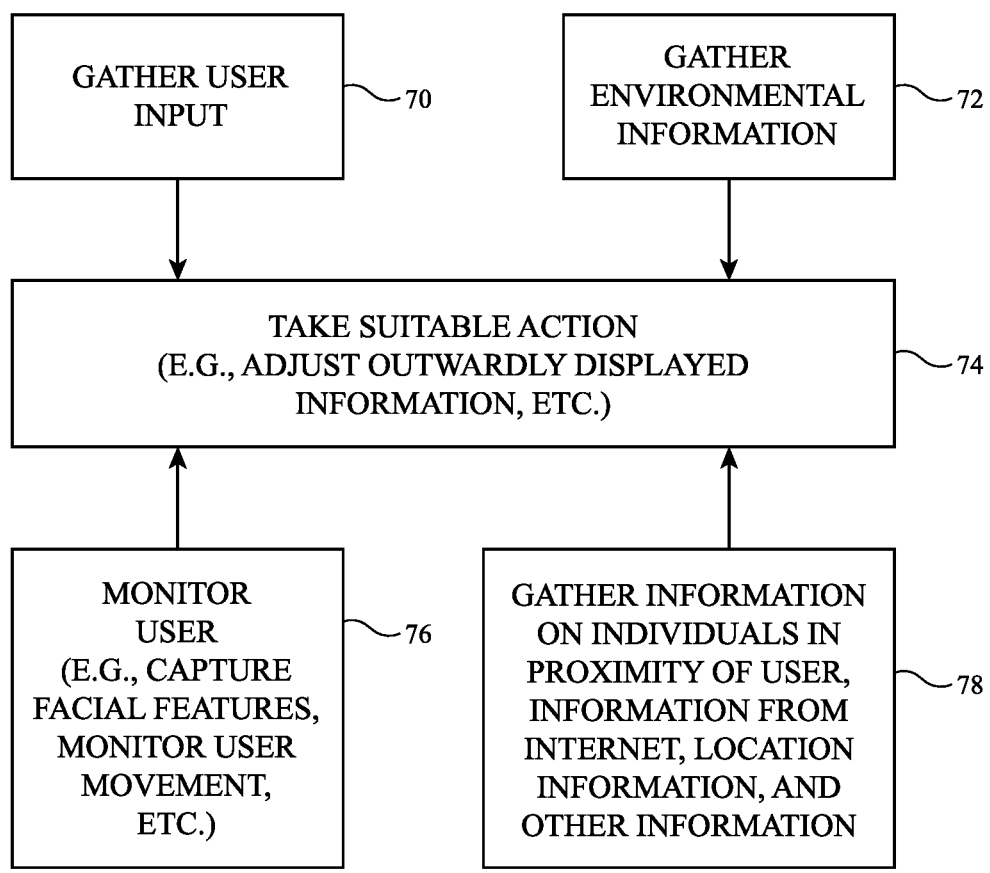
FIG. 8 is a flow chart of illustrative operations involved in operating a system with a head-mounted display in accordance with an embodiment.

A flow chart of illustrative operations involved in using device 10 is shown in FIG. 8.

During the operations of block 70, control circuitry 12 may use user input devices 18 such as buttons, touch sensors, joysticks, sensor gloves, voice input microphones, external equipment 30 (e.g., equipment such as a remote control, cellular telephone, or computer that gathers user input and that supplies this user input wirelessly to wireless circuitry 14 from a remote control, cellular telephone, computer, or other external equipment 30), and/or other user input devices for gathering user input. The user input that is gathered may include user input to select desired information to output to display 44, user input to select which types of input to use in adjusting the images on display 44, etc.

During the operations of block 72, control circuitry 12 may use environmental sensors 20 (e.g., ambient light sensors, temperature sensors, etc.) to gather information on the operating environment of device 10 (e.g., ambient light level, device temperature and/or ambient air temperature, light color indicating whether the user is indoors in a warm lighting environment or outdoors in a cold lighting environment, humidity information, and/or other information on the environment in which the user is operating device 10).

During the operations of block 76, user monitoring sensors 22 (e.g., digital image sensors in cameras facing user 34, gaze detection circuitry, heart rate sensors, other physiological sensors, etc.) may be used in monitoring the user's facial expression, stress level, heart rate, temperature, perspiration level, and/or other attributes of the user's state. For example, sensors 22 may capture images of the facial features of a user such as the user's eyes. The operations of block 76 may also involve gathering information on user movement using a motion sensor in user monitoring sensors 22. Motion information may indicate whether a user is at rest or is walking, running, riding a bicycle, or is motion performing other physical activities.

During the operations of block 78, information can be gathered on the location of user 34 and individuals in the vicinity of device 10. This information can be gathered by obtaining information on the location of device 10 using satellite navigation system receiver circuitry such as Global Positioning System circuitry and by gathering corresponding location information on the devices of the individuals in the vicinity of device 10 (e.g., using satellite navigation system receivers in those devices). Comparing the location of nearby devices to the location of device 10 can reveal the relative distance of the nearby devices to device 10 and can therefore reveal whether display 44 is visible from the individuals associated with those nearby devices. If desired, information on the distance between device 10 and nearby individuals can be gathered using other measurements such as received signal strength measurements. Information on whether the devices of individuals (e.g., equipment 30 or other equipment) are in the vicinity of device 10 can also be made by establishing Bluetooth® links, WiFi® links, or other wireless local area network links between device 10 and the devices of the individuals. Successful link formation may indicate that the devices are in the vicinity of device 10. Camera sensor data (e.g., image recognition data, motion detection data, etc.) and/or other sensor data (e.g., information from infrared sensors, etc.) may also be used in detecting and identifying nearby individuals during the operations of block 78.

In addition to identifying nearby individuals, the operations of block 78 may involve gathering information on environmental conditions and other information from the internet and/or other external sources. As an example, information on the current weather (e.g., wind speed, temperature, humidity, etc.) may be gathered by circuitry 12 using a wireless connection such as link 32 with an online weather source. Control circuitry 12 may use information on code being executed by control circuitry 12 to determine details of a user's gaming environment or other software being run on device 10.

The current operating context of device 10 may depend on whether the user is at work, at home, or in other environments. During the operations of block 78, information that is gathered on the location of device 10 may be used in identifying the user's current operating environment (at work, at home, traveling away from home, etc.).

During the operations of block 74, control circuitry 12 can take suitable action based on the information gathered during the operations of blocks 70, 72, 76, and/or 78. For example, control circuitry 12 can generate images, can use cameras to capture images of user 34, can overlay graphics generated by circuitry 12 on captured images, and/or can otherwise display information on display 44 or other visual output device. While displaying this information, user preferences may be taken into account. For example, user input such as user-selected settings gathered during the operations of block 70 may be used in determining whether to display a camera image of the user or cartoon graphics representing the user (e.g., user facial feature graphics such as eye graphics, nose graphics, eyebrow graphics, skin graphics, or other graphic elements). Environmental information may also be taken into account. For example, if environmental measurements gathered during the operations of block 72 indicate that the current weather is windy, computer-generated images such as moving graphics with blowing hair may be superimposed on static facial features on display 44. Images captured of the real-world environment surrounding the user may be presented on the user viewable display (as stand-alone real-world images or as real-world images overlaid with virtual reality content) while corresponding content is displayed on the publicly viewable display (e.g., a message such "I'm currently viewing the real world", a pair of open eyes, or other "seeing outside" information indicating that the real world is visible to the user). User facial feature information (pupil size, point-of-gaze, eyebrow position, etc.) and other attributes of the user (e.g., physiological data) gathered during the operations of block 76 may be used in adjusting corresponding facial features on display 44 and/or other content on display 44. Information on whether the user is walking, riding a bicycle, running, or is otherwise moving may be used to adjust the information displayed on display 44. For example, a user may be less open to social engagement when riding a bicycle, so display 44 may display a warning or other information that alerts nearby people that the user is preoccupied. If desired, information on individuals within a predetermined distance of the user and other information gathered during the operations of block 78 may also be used in controlling the information presented on display 44. For example, one type information (or no information) may be displayed on display 44 when no nearby individuals are detected, another type of information may be displayed when strangers are detected nearby, and yet another type of information may be displayed on display 44 when a person known to the user is detected in viewing distance of display 44. Different types of information may be displayed on display 44 based on the user's location (work, home, etc.). For example, display 44 may display an informal greeting or detailed status information for members of the user's family when the user is using device 10 at home, whereas display 44 may display information that is more formal and less personal when the user is using device 10 at work.

Additional examples of content that may be displayed on display 44 are shown in FIGS. 9, 10, 11, 12, 13, and 14.

Figure 9:
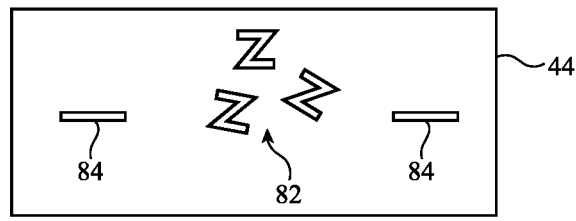
FIG. 9 is a diagram of illustrative content such as stylized letters that may be publicly displayed on a head-mounted device in accordance with an embodiment.

In the example of FIG. 9, the user is preoccupied with a video game or other content being displayed on user-viewable display 46, so stylized letters 82 indicating that the user is preoccupied may be presented on display 44. Graphic representations of closed eyes such as symbols 84 may also be presented to indicate to people in the vicinity of the user that the user is not ready to engage with the outside world (e.g., because the user is immersed in virtual reality content and/or is not able to view the real world). Content of the type shown in FIG. 9 may therefore serve as a graphical representation that the user is busy and does not wish to be disturbed.

Figure 10:
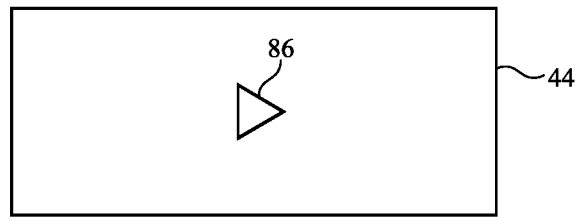
FIG. 10 is a diagram of an illustrative symbol that may be publicly displayed on a head-mounted device in accordance with an embodiment.

FIG. 10 shows another graphical symbol (a media playback "play" symbol) of the type that may be presented on display 44 to show nearby people that the user is occupied with consuming content viewable on user-viewable display 46 (e.g., because virtual reality content or other engaging content is being presented on display 46).

Figure 11:
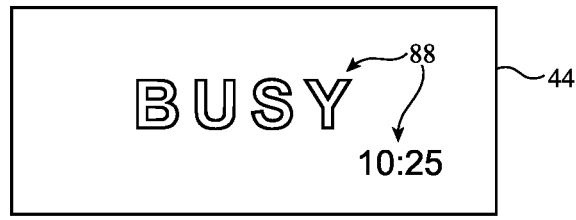
FIG. 11 is a diagram of illustrative text that may be publicly displayed on a head-mounted device in accordance with an embodiment.

If desired, information on display 44 may include alphanumeric text 88, as shown in FIG. 11. The text may inform people in the vicinity of user 34 of the user's name, the user's current status (e.g., "busy"), information on the current date and time, information on a game the user is playing such as a game title, current score, information other game participants, information on the user's current level in the game, a game creator logo, etc., information on a video or other content being viewed by the user (e.g., title, running time, current amount viewed and/or time remaining, rating, a content provider logo, etc.). Text information such as personalized messages (e.g., text previously supplied by the user) may also be displayed for friends and family members detected in the vicinity of device 10. Appropriate user-defined messages may also be displayed to other people in the vicinity of the user. If desired, symbols such a heart symbols and/or other symbols may be displayed when device 10 detects that a user's friends or family members are in the vicinity of the user (e.g., when friends or family members are detected near the user's location during the operations of block 78 of FIG. 8).

Figure 12:
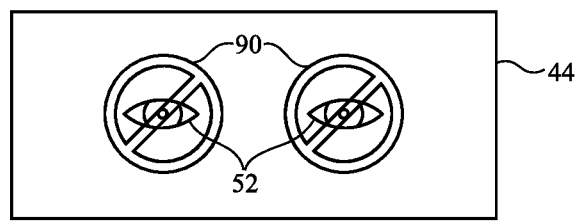
FIG. 12 is a diagram of illustrative symbols that may be overlaid on user facial features such as eyes on a head-mounted device to indicate that a user is busy in accordance with an embodiment.

In the illustrative configuration of FIG. 12, busy ("do not disturb") icons 90 have been overlaid on eyes 52 to indicate that the user is not viewing the outside world (e.g., because the user is immersed in content being presented on user-viewable display 46 and is not viewing and/or not paying attention to the user's surroundings).

Figure 13:
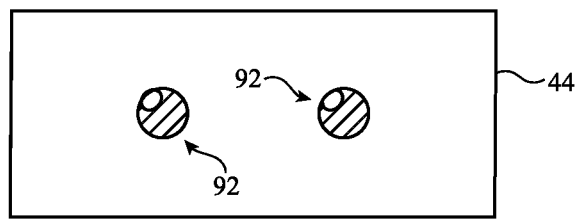
FIG. 13 is a diagram of illustrative symbolic eyes that may be publicly displayed on a head-mounted device in accordance with an embodiment.
Figure 14:
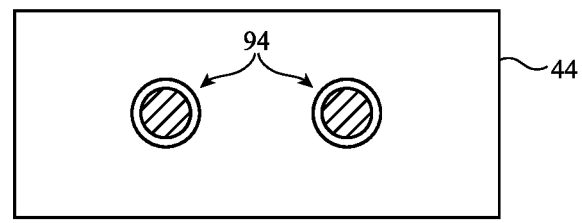
FIG. 14 is a diagram of illustrative symbolic eyes of the type that may be uncolored when a user is focusing on the user's surroundings or that may be colored red to indicate that a camera or microphone is being used to record content in the vicinity of a user in accordance with an embodiment.
Figure 15:
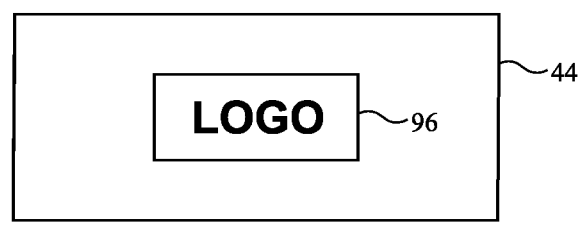
FIGS. 15, 16, and 17 are diagrams showing various illustrative images that may be displayed publicly on a head-mounted device in different usage modes in accordance with an embodiment.
Figure 16:
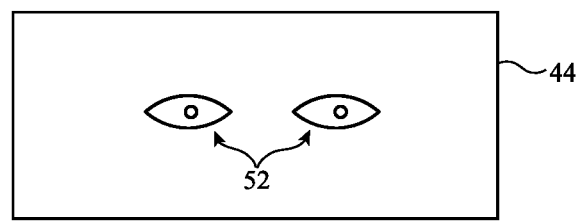

FIG. 13 illustrates how simplified eye symbols 92 (sometimes referred to as digital eyes) may be displayed to indicate that the user is in a gaze mode (viewing the user's surroundings freely, but not riveted on a particular object in the user's surroundings). When the user's gaze is fixed on an object of interest, eye symbols such as symbols 94 of FIG. 14 may be displayed (e.g., with white centers). The color of the centers or other visual attributes of eye symbols 94 may be dynamically adjusted (e.g., to a color such as red) when the user uses an outwardly facing camera and/or audio recording device to record information in the user's surroundings.

The information on display 44 may change as the user's use of device 10 changes. Consider, as an example, the scenario of FIGS. 15, 16, and 17. Initially, a user may be viewing a virtual reality video or game on user-viewable display 46. While viewing this content, display 44 may be used to display a logo such as logo 96 of FIG. 15 that is associated with the creator of the currently playing content (e.g., a movie studio logo). Additional information such as content title information, rating information, running time information, time remaining information, and other information on the content being displayed on display 46 may also be presented on display 44.

When the user pauses content playback and is viewing the real world (real-time video of the real world in the user's surroundings captured with a camera and presented on display 46 and/or a view of the real world presented through transparent portions of device 10, etc.), the user is concentrating on the user's surroundings. In this situation, representations of the user's eyes such as eyes 52 of FIG. 16 may be displayed on display 44.

Figure 17:
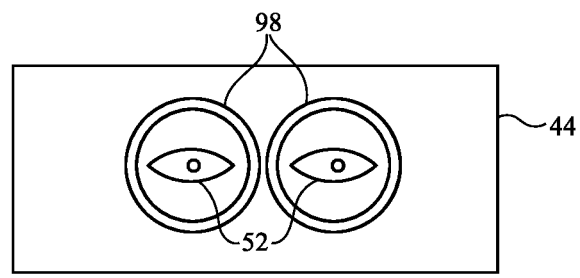

FIG. 17 shows how icons 98 may be overlaid and/or placed adjacent to eyes 52 when the user is operating in a mixed reality environment. When in a mixed reality environment, the user is viewing real world content (e.g., through a camera and display 46 and/or through transparent portions of device 10) and is also viewing augmented reality content on display 46 (e.g., computer-generated content such as text, graphics, video, etc.). The simultaneous presence of eyes 52 and icons 98 indicate to people in the vicinity of user 34 that the user is not entirely focused on the outside world, but rather is in an augmented reality environment containing both virtual and real-world elements.

If desired, publicly viewable display 44 may be replaced and/or supplemented by low resolution publicly viewable visual output devices (e.g., devices 24 of FIG. 3, sometime referred to as light-emitting devices, light sources, light-emitting components, etc.). These lower-resolution output devices may have a relatively small number of individually controllable light-emitting devices (e.g., one, two, at least two, at least three, at least four, at least ten, 2-10, at least 20, fewer than 20, fewer than 10, fewer than 5, or other suitable number). Examples of light-emitting components that may be used in a lower resolution publicly viewable visual output device include, light-emitting diodes, lasers, lamps, electrophoretic components, backlit patterned ink (e.g., ink with an alphanumeric and/or symbol-shaped opening to allow backlight illumination to pass), electroluminescent components, segmented indicators such as sixteen segment indicators for displaying alphanumeric characters, etc.

These non-display visual output devices do not include full resolution pixel arrays for displaying images and are therefore not generally referred to as displays. Nevertheless, lower resolution non-display visual output devices can display any information of the type that is displayed on publicly viewable display 44. Because lower resolution components are used in forming the visual output device, power may be conserved and component cost may be minimized.

Figure 18:
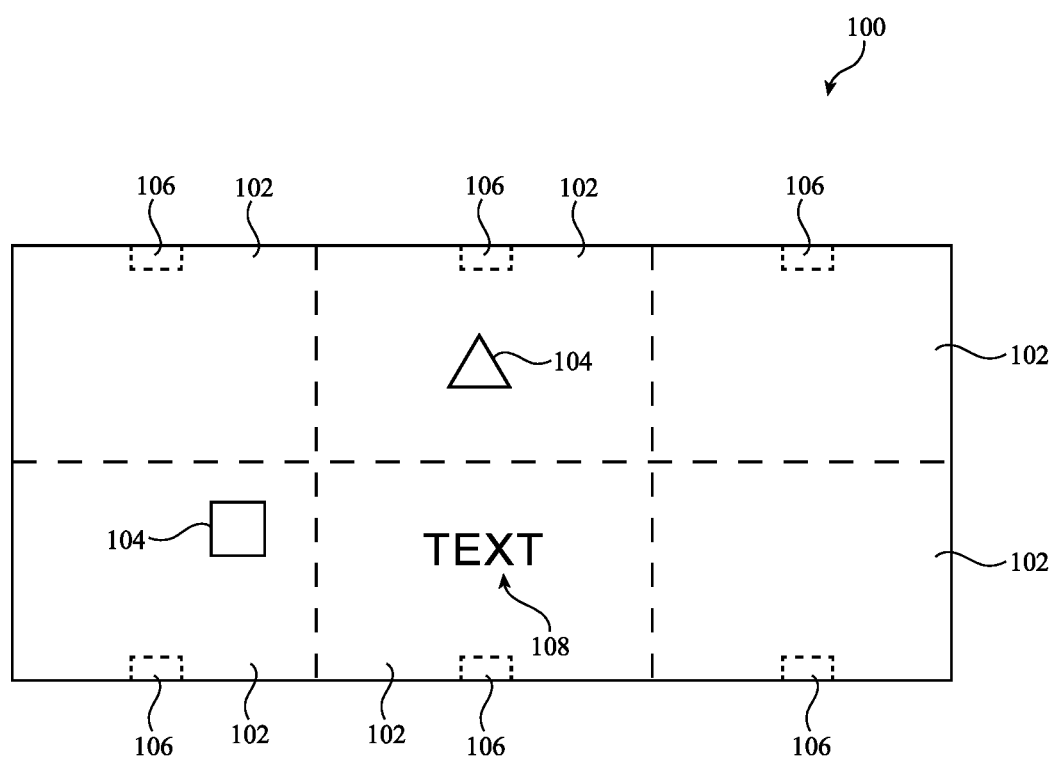
FIG. 18 is a diagram of an illustrative publicly viewable visual output device for a head-mounted display in accordance with an embodiment.

Consider, as an example, visual output device 100 of FIG. 18. In the example of FIG. 18, device 100 has six individually adjustable regions 102. This is merely illustrative. Visual output device 100 may have a single area that can be illuminated or not illuminated and/or may have other suitable numbers of individually adjustable visual output areas (e.g., 2-10, 5-20, at least 2, fewer than 25, etc.). The use of six individually adjustable regions 102 in the example of FIG. 18 is merely illustrative. Regions 102 may have lateral dimensions of 0.5-5 cm, at least 0.2 cm, at least 0.4 cm, less than 25 cm, and/or other suitable sizes.

Each region 102 may be individually adjusted to selectively display items such as illustrative graphics such as symbols 104 and/or illustrative text 108. This information may include user facial features, predefined text, logos, icons, etc.

With one illustrative configuration, each region 102 has a printed ink pattern with an opening (clear, diffuse, colored, etc.) that overlaps a respective light source. The light source may, as an example, have a light guide plate that is edge lit using a corresponding light-emitting diode 106. In other configurations, a single edge-lit light guide may be overlapped by all regions 102 and each region 102 may be a respective individually addressable region in a low-resolution electrophoretic light modulating device (e.g., a six-area device in the example of FIG. 18). Other types of lower resolution visual output devices that may be used in visual output device 100 include lamps, electroluminescent panels, lasers, reflective visual output components that are not backlit, etc. If desired, areas 104 may be illuminated using light-emitting diodes or other light sources without using light guide plates (e.g., in a direct-lit backlight scheme). Directly viewable visual output devices such as individual light-emitting diodes, lamps, etc. may also be used. These devices may convey information through use of colors, flashing patterns, intensity, location on device 10, and/or other arrangements in addition to or instead of using patterned backlit openings such as openings for symbols 104 and/or text 108 in the example of FIG. 18.

The foregoing description, for purposes of explanation, used specific nomenclature to provide a thorough understanding of the described embodiments. However, it will be apparent to one skilled in the art that the specific details are not required in order to practice the describe embodiments. Thus, the foregoing descriptions of the specific embodiments described herein are presented for purposes of illustration and description. They are not taken to be exhaustive or to limit the embodiments to the precise forms disclosed. It will be apparent to one of ordinary skill in the art that many modifications and variations are possible in view of the above teachings.

What is claimed is:

1. A head-mounted device, comprising:
   a head-mountable support structure;
   an inwardly facing display supported by the head-mountable support structure, wherein the inwardly facing display is operable in a real-world environment mode and a virtual reality mode; and
   an outwardly facing display supported by the head-mountable support structure, wherein the outwardly facing display is configured to display first display content when the inwardly facing display is in the real-world environment mode and second display content when the inwardly facing display is in the virtual reality mode, wherein the first display content includes eye images and the second display content is free of eye images, and wherein the outwardly facing display has a lower resolution than the inwardly facing display.

2. The head-mounted device defined in claim 1 further comprising a camera configured to capture real-time video of an environment, wherein the real-time video is displayed on the inwardly facing display in the real-world environment mode.

3. The head-mounted device defined in claim 2 wherein the inwardly facing display is configured to display virtual content in the virtual reality mode.

4. The head-mounted device defined in claim 3 wherein the inwardly facing display is operable in an augmented reality mode in which the real-time video is displayed on the inwardly facing display and the virtual content is overlaid onto the real-time video, and wherein the outwardly facing display is configured to overlay additional display content onto the eyes when the inwardly facing display is in the mixed reality mode.

5. The head-mounted device defined in claim 1 further comprising a sensor configured to record an environment, wherein a color of the first display content on the outwardly facing display is adjusted based on whether the sensor is actively recording the environment.

6. The head-mounted device defined in claim 5 wherein the sensor is selected from the group consisting of: a microphone and a camera.

7. The head-mounted device defined in claim 1 wherein the inwardly facing display comprises a liquid-crystal-on-silicon display and the outwardly facing display comprises an organic light-emitting diode display.

8. The head-mounted device defined in claim 1 further comprising an ambient light sensor configured to measure an ambient light level, wherein the outwardly facing display is adjusted based on the ambient light level.

9. The head-mounted device defined in claim 1 further comprising an ambient light sensor configured to measure an ambient light color, wherein the outwardly facing display is adjusted based on the ambient light color.

10. A head-mounted device, comprising:
    a head-mountable support structure;
    a camera configured to capture real-time video of a real world environment;
    an inwardly facing display supported by the head-mountable support structure, wherein the inwardly facing display is operable in a first real-world viewing mode in which the real-time video of the real world environment is displayed on the inwardly facing display without virtual elements and an augmented reality mode in which the virtual elements and the real-time video of the real world environment are displayed on the inwardly facing display; and
    an outwardly facing display supported by the head-mountable support structure, wherein the outwardly facing display is configured to:
       display eyes in response to the inwardly facing display displaying the real-time video of the real world environment while operating in the first real-world viewing mode; and
       overlay image content onto the eyes in response to the inwardly facing display displaying the virtual elements and the real-time video of the real world environment while operating in the augmented reality mode.

11. The head-mounted device defined in claim 10 wherein the inwardly facing display is operable in a virtual reality mode in which the virtual elements are displayed on the inwardly facing display without the real-time video, and wherein the outwardly facing display is configured to display additional image content without the eyes when the inwardly facing display is in the virtual reality mode.

12. The head-mounted device defined in claim 10 further comprising a sensor configured to record an environment, wherein a color of the image content on the outwardly facing display is adjusted based on whether the sensor is actively recording the environment.

13. The head-mounted device defined in claim 12 wherein the sensor is selected from the group consisting of: a microphone and a camera.

14. The head-mounted device defined in claim 10 wherein the inwardly facing display comprises a liquid-crystal-on-silicon display and the outwardly facing display comprises an organic light emitting diode display having a lower resolution than the inwardly facing display.

15. A head-mounted device, comprising:
- a head-mountable support structure;
- a sensor configured to record an environment;
- an inwardly facing display supported by the head-mountable support structure and configured to display first display content; and
- an outwardly facing display supported by the head-mountable support structure and configured to display second display content, wherein the second display content includes a first color when the sensor is not actively recording the environment, and wherein the first color changes to a second color when the sensor is actively recording the environment.

16. The head-mounted device defined in claim 15 wherein the sensor is selected from the group consisting of: a microphone and a camera.

17. The head-mounted device defined in claim 15 wherein the second display content on the outwardly facing display includes eyes when the inwardly facing display is displaying real-time video of the environment.

18. The head-mounted device defined in claim 17 wherein the second display content on the outwardly facing display excludes the eyes when the inwardly facing display is displaying virtual content.

19. The head-mounted device defined in claim 18 wherein the second display content on the outwardly facing display includes overlaid display content that is overlaid onto the eyes when the inwardly facing display is displaying the virtual content and the real-time video of the environment.

* * * * *

UNITED STATES PATENT AND TRADEMARK OFFICE
CERTIFICATE OF CORRECTION

| | | |
|---|---|---|
| PATENT NO. | : 12,498,895 B2 | Page 1 of 1 |
| APPLICATION NO. | : 18/433601 | |
| DATED | : December 16, 2025 | |
| INVENTOR(S) | : Jonathan P. Ive et al. | |

It is certified that error appears in the above-identified patent and that said Letters Patent is hereby corrected as shown below:

In the Claims

Column 22, Line 45, "a first real-world" should read -- a real-world --

Signed and Sealed this
Thirteenth Day of January, 2026

John A. Squires
*Director of the United States Patent and Trademark Office*